June 25, 1957 — J. W. SCOTT, JR., ET AL — 2,797,190
ADSORPTION SEPARATION PROCESS
Filed Sept. 20, 1954 — 3 Sheets-Sheet 1

FIG.1  FIG.2  FIG.3

INVENTORS
JOHN W. SCOTT, JR.
FRANK M. HAZARD, JR.
BY
ATTORNEYS

United States Patent Office 2,797,190
Patented June 25, 1957

2,797,190
ADSORPTION SEPARATION PROCESS

John W. Scott, Jr., Berkeley, and Frank M. Hazard, Jr., Concord, Calif., assignors to California Research Corporation, San Francisco, Calif., a corporation of Delaware Application September 20, 1954, Serial No. 457,096

13 Claims. (Cl. 196—147)

The present invention relates to improvements in liquid phase adsorption separations and more particularly to improvements in cyclic liquid phase adsorption separation processes employing multiple fixed adsorbent beds and moving feed and withdrawal points as disclosed in U. S. Patent No. 2,599,545 issued June 10, 1952 to Egan and Scott, and U. S. Patent No. 2,621,149 issued December 9, 1952 to Scott and Eagle.

Liquid-phase adsorption separations may be conducted employing a fixed adsorbent bed in batch operation, a moving mass of adsorbent in a continuous operation, or a plurality of fixed adsorbent beds in a cyclic operation. In any of these arrangements of the adsorbent, a simple separation may be conducted by the steps of alternately contacting the adsorbent with a liquid feed to separate an adsorbate and an effluent percolate and then with a stripping liquid to remove the adsorbate from the adsorbent and to regenerate it for reuse. According to the method of operating such an adsorption process disclosed in U. S. Patent No. 2,621,149, either the first effluent from the adsorbent during the feed contacting step, which first effluent consists essentially of stripping liquid resident in the adsorbent mass at the conclusion of its previous regeneration, is recycled into contact with the adsorbent during the stripping liquid contacting step or the first effluent from the adsorbent during the stripping liquid contacting step, which first effluent contains adsorbate, and stripping liquid, and some percolate, is recycled into contact with the adsorbent following the feed contacting step and prior to the stripping liquid contacting step, or both of these first effluents are recycled into contact with the adsorbent at the time and in the manner described.

In the improved method of operating such an adsorption process according to the present invention, either the last effluent from the stripping liquid contacting step, which last effluent consists essentially of stripping liquid lower in adsorbate content than the adsorbate product stream, is recycled into contact with the adsorbent during the subsequent stripping liquid contacting step, or an intermediate effluent from the feed contacting step after the essentially pure first effluent strippant, but before the product percolate strippant mixture, which intermediate effluent is lower in percolate content than the percolate product stream, is recycled into contact with the adsorbent at the conclusion of the regeneration step, or both of the effluents are recycled into contact with the adsorbent at the time and in the manner described. The advantages which attend the employment of these recycle steps hereinafter described are realized in batch, continuous, and cyclic operation. The cyclic operation employing a plurality of fixed adsorbent beds is particularly well adapted to the inclusion of the recycle steps of the present improved process.

In a cyclic liquid-phase adsorption separation fixed adsorbent beds are arranged in at least two serially interconnected groups, one of these constituting an adsorption zone and another a regeneration zone. In the adsorption zone a liquid feed is contacted with a solid adsorbent to separate an adsorbate and a nonadsorbed percolate. In the regeneration zone the adsorbate separated in previous cycles is removed from the adsorbent and the adsorbent is regenerated for reuse. In the course of a cycle of operation the capacity of one of the adsorbent beds in the adsorption zone to effect further separation of the feed is exhausted, and the regeneration of one of the adsorbent beds in the regeneration zone is completed. In the succeeding cycle of operation the spent adsorbent bed is transferred from the adsorption zone to the regeneration zone, and the regenerated adsorbent bed is transferred from the regeneration zone to the adsorption zone. Regeneration is preferably effected by contacting the spent adsorbent with a stripping liquid, that is, with a liquid for which the adsorbent has a lower adsorptive preference than it has for the adsorbate. The practice requires that two secondary separations be made, ordinarily by distillation. First, the effluent of the regeneration zone is distilled to separate the stripping liquid from the material which it has removed from the adsorbent. Second, a regenerated adsorbent bed at the time of its transfer to the adsorption zone in initiating a new cycle of operation is saturated with stripping liquid. When the feed is introduced into the adsorption zone this stripping liquid flows from that zone as well as the percolate. It has been the practice to recover these liquids together and separate them by distillation. Accordingly, secondary separations are an important factor in determining operation and installation costs in any application of the process.

It has now been found that the volume of liquid required to be distilled in secondary separations may be substantially reduced by recycling certain of the process streams as hereinafter described.

Accordingly, it is the object of the present invention to reduce substantially the volume of liquid required to be distilled in secondary recovery separations in a liquid-phase adsorption separation process in which a stripping liquid is employed to remove the adsorbate from the adsorbent and to regenerate the adsorbent for reuse. This object is particularly well realized in a cyclic adsorption process of this character where a plurality of fixed adsorbent beds disposed in an adsorption zone and a regeneration zone is employed.

Other and further objects will be made evident in the following detailed description of the process of the invention.

The appended drawings are diagrammatic illustrations of process flow patterns and apparatus suitable for the practice of the invention of which.

Figure 1:
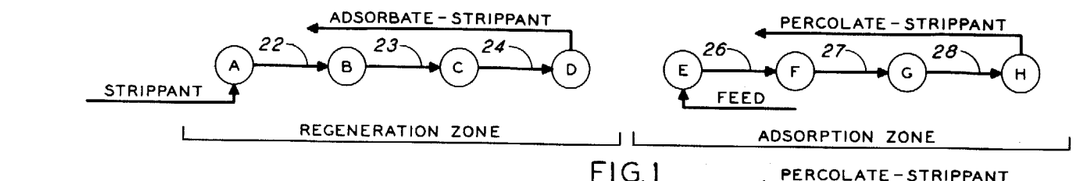
Figure 1 illustrates a simple cyclic adsorption separation.

Referring now to Figure 1, the letters A to H inclusive indicate masses of particulate solid adsorbent which are suitably equivalent in respect to the quantity and character of adsorbent in each mass. The masses A to D inclusive are serially connected by lines 22, 23, and 24 to constitute a regeneration zone and masses E to H inclusive are serially connected by lines 26, 27, and 28 to constitute an adsorption zone. A liquid feed is introduced into mass E, the first terminal adsorbent mass of the adsorption zone, and the nonadsorbed percolate together with stripping liquid retained by the adsorbent from the regeneration step in the previous cycle of operation is recovered from mass H, the last terminal mass of the adsorption zone. The preferentially adsorbed component of the feed is removed from it by the adsorbent and held as an adsorbate. A concentration gradient of the adsorbate held by the several adsorbent masses of the percolate refining zone is established, this concentration being highest at E and lowest at H, that is, the concentration decreases in the direction of flow within the zone. A stripping liquid, that is, a liquid for which the absorbent shows similar or lower adsorptive preference than it shows for the adsorbate, and which, for example, may be a mixture of hydrocarbon classes, is passed into mass A, the first terminal adsorbent mass of the regeneration zone and acts on the adsorbent to remove from it the adsorbate separated in previous cycles of operation. A concentration gradient of the adsorbate held on the adsorbent is established in the regeneration zone, the concentration being lowest at A and highest at D, that is, the concentration increases in the direction of flow within the zone. A mixture of stripping liquid and adsorbate is recovered from mass D, the last terminal mass of the regeneration zone. The percolate-stripping liquid mixture from mass H and stripping liquid-adsorbate mixture from mass D are separated usually by distillation, the percolate and adsorbate being retained as process products and the stripping liquid being reused in the process. The indicated flow of liquids is continued until the adsorbent in mass E is exhausted; that is, it has picked up so much adsorbate from the feed that it has no capacity for further separation of the adsorbate from the feed, and until the adsorbent in mass A is regenerated, that is, the stripping liquid has removed substantially all of the previously separated adsorbate from it and it is ready for reuse. Upon the exhaustion of mass E and the regeneration of mass A, a new cycle is initiated by altering the connecting lines so that mass A, the first terminal adsorbent mass of the regeneration zone, becomes the last terminal adsorbent mass of the adsorption zone and so that mass E, the first terminal adsorbent mass of the adsorption zone becomes the last terminal mass of the regeneration zone in the new cycle. The designations, first terminal adsorbent mass and the last terminal adsorbent mass, are made in the sense that the flow liquid within each zone is from the first terminal mass to the last terminal mass. In the new cycle the stripping liquid is introduced into mass B and the stripping liquid-adsorbate mixture is withdrawn from mass E, and feed is introduced into mass F and a percolate-stripping liquid mixture is withdrawn from mass A. The residual feed mixture in mass E at the completion of the first cycle is preferably drained from the mass or displaced into mass F by stripping liquid prior to the initiation of the new cycle.

Operation according to Figure 1 is the simplest form of operation of a cyclic process employing multiple fixed adsorbent beds and moving feed and withdrawal points. Modifications of this simplest flow pattern designed to effect sharper separation are disclosed in U. S. Patent No. 2,599,545, issued June 10, 1952 to Egan and Scott. These modifications include recycle of a portion of the adsorbate product after distillation and the introduction of a desorbing liquid, that is, a liquid more strongly adsorbed than the adsorbate, following the feed and prior to the introduction of stripping liquid. Additional modifications directed toward greater sharpness of separation and economy of operation are disclosed in U. S. Patent No. 2,621,149, issued December 9, 1952 to Scott and Eagle. In order to lay a clear basis for description of the present invention, the modifications covered in the latter patent, U. S. No. 2,621,149, are shown in combined form in Figure 2 and discussed beginning in the next paragraph.

Figure 2:
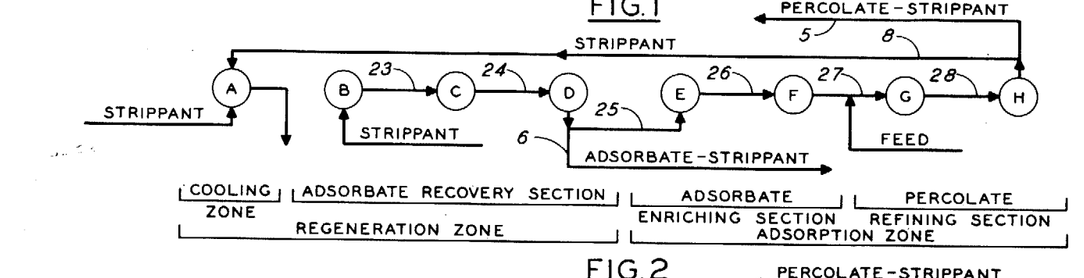
Figure 2 illustrates an improved type of cyclic adsorption process employing the improvements disclosed in U. S. Patent No. 2,621,149.

In the first process modification shown in Figure 2 the first effluent of the adsorption done is conducted via line 8 to mass A for use in the regeneration zone instead of being distilled as in the simple process shown in Figure 1. It has been found that the stripping liquid resident in adsorbent mass H at the conclusion of the preceding cycle is displaced from mass H during the illustrated cycle without appreciable mixing with the nonpreferentially adsorbed percolate fraction of the feed and may be directly used in the regeneration zone without distillation. The liquid capacity of an adsorbent mass is the sum of the volume of interstitial space between the adsorbent particles and the pore volume of the adsorbent. In silica gel of 28–200 mesh size this capacity may amount to about 0.8 cc. of liquid for each gram of silica gel in the mass. In general at least one-half of the liquid capacity of adsorbent mass H may be recycled to the regeneration zone without distillation; in some separations a larger volume, for example a volume equal to the entire liquid capacity, as above defined, of mass H may be recycled to the regeneration zone. In a separation of kerosene having an aromatic content of about 22% employing isooctane as the stripping liquid one-half of the liquid capacity of mass H is recycled and a reduction of 20% in the volume of liquid effluent from the adsorption zone which must be distilled is obtained. In a separation of thermally cracked naphtha employing pentane as the stripping liquid, substantially all of the liquid capacity of mass H is recycled and the volume of adsorption zone effluent going to distillation may be reduced by as much as 50%. Following the introduction of the first effluent from the adsorption zone into the regeneration zone via line 8, the subsequent effluent from the adsorption zone during the cycle comprising percolate and stripping liquid passes to distillation via line 5.

In the cycle illustrated in Figure 1, mass D at the beginning of the cycle would contain some interstitial, unseparated feed liquid which during the first part of the cycle may be segregated and fed into the adsorption zone in later cycles or passed directly into mass E at the beginning of the illustrated cycle. Figure 2, therefore, includes a further modification of the cyclic adsorption process in which the first liquid effluent from the regeneration zone is directly employed to effect a purification of the adsorbate prior to its removal from the adsorbent. In the cycle illustrated, adsorbent masses A to D inclusive constitute the regeneration zone and masses E to H inclusive constitute the adsorption zone. Serially connected adsorbent masses B, C, and D constitute the adsorbate recovery section, serially connected masses E and F constitute the adsorbate enriching section, serially connected masses G and H constitute a percolate refining section, and mass A constitutes a cooling section through which cold stripping liquid is passed to cool the regenerated adsorbent of mass A preparatory to its incorporation in the percolate refining section of the adsorption zone in the next succeeding cycle. The adsorbate enrichment section and the percolate refining section are serially connected to each other by line 27 throughout the illustrated cycle. As indicated above, a modification of the cyclic adsorption process has previously been disclosed in which adsorbate stripped from the adsorbent and separated from the stripping liquid by distillation is recycled into contact with the adsorbent following the contact of the adsorbent with the feed liquid. The purpose of such a recycle is to obtain an adsorbate product of higher purity and an increased yield of percolate. When the adsorbent is fully spent in the adsorption zone, an equilibrium condition is attained in which the material adsorbed is of such a composition that further contact with the feed produces no net change in its composition. This adsorbed material at equilibrium contains some of the nonpreferentially adsorbed fraction of the feed. If the adsorbent prior to regeneration is contacted with a liquid richer than the feed in the preferentially adsorbable component of the feed, then net adsorption of this component occurs and net desorption of the nonpreferentially adsorbable component occurs with the over-all result that the finally recovered adsorbate may be purified and substantially freed of the nonpreferentially adsorbable component. It has been found that this desired purification may be effected by passing the first effluent of the regeneration zone into contact with the adsorbent which has been exhausted and thus has no further capacity to separate the feed, instead of using adsorbate separated from the adsorbate-stripping liquid mixture by distillation, for this purpose. Thus, the first effluent from adsorbent mass D, the last terminal mass of the regeneration zone is passed into mass E of the adsorbate enrichment section via line 25. The latter portion of the effluent from mass D is passed to distillation via line 6. When regeneration is effected in the preferred manner with hot stripping liquid the first effluent of the regeneration zone is substantially richer in the preferentially adsorbable component of the feed than is the feed itself. In the separation of kerosene containing about 22% aromatics, utilization of the first effluent of the regeneration zone instead of the preferentially adsorbed component of the feed which has been separated from the stripping liquid by distillation reduced the volume of stripping liquid required to be distilled by more than 30%. The volume of the first effluent of the regeneration zone introduced into the adsorbate enrichment section during a cycle is ordinarily about equal to the liquid capacity of one adsorbent mass.

Recapitulating, during the first part of the illustrated cycle the effluent of the percolate refining section is passed from mass H via line 8 to mass A and the effluent of the adsorbate recovery section is passed from mass D via line 25 to mass E, the first terminal mass of the adsorbate enriching section. During the latter part of the illustrated cycle the effluents of the percolate refining section and of the adsorbate recovery section are passed to separate distillation via lines 5 and 6, respectively. In the first part of the cycle the first effluent of the percolate refining section may be recycled via line 8 to mass B instead of mass A and similar economy of operation obtained; however, this recycled stream would have to be heated prior to the introduction into mass B in preferred operation. Operation in the manner illustrated in Figure 2 makes possible the production of an adsorbate and a percolate of improved quality with large reductions in the volumes of percolate-stripping liquid mixture and adsorbate-stripping liquid mixture which must be distilled per unit volume of product recovered. Successive cycles are initiated by regrouping the adsorbent masses so that mass A, the first terminal adsorbent mass of cooling section if there be more than one mass in the section, mass B, the first terminal mass of the adsorbate recovery section and mass E, the first terminal mass of the adsorbate enriching section become, respectively, the last terminal masses of the percolate refining section, the cooling section and the adsorbate recovery section, and by moving the points of introduction of feed, of hot stripping liquid, and of cold stripping liquid to the next serially connected adsorbent mass in the percolate refining section, the adsorbate recovery section, and the cooling section respectively. It is seen that if a total of X adsorbent masses are employed in the process, each mass will occupy in the $X+1$ cycle of operation the same relative position that it occupies in the first cycle.

The further modifications which have now been discovered and which produce additional great economies in process operation will now be described in detail with reference to the particular figures of drawing.

Figure 3:
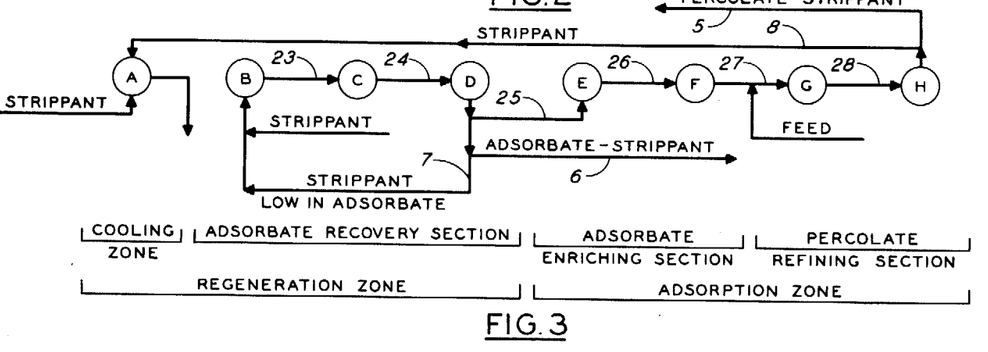
Figures 3 to 5 inclusive illustrate several modifications of the process flow pattern in the process of the invention.

Referring now to Figure 3, the last effluent from adsorbent mass D, the last terminal mass of the regeneration zone, is fed first in the next cycle to the first terminal mass of the adsorbate recovery section, before using pure strippant. This last effluent from mass D is lower in adsorbate content than the adsorbate-strippant product stream. It has been found that by operating in the manner indicated, that portion of the interstitial liquid whose gradient composition ranges from that of the desired product stream consisting of strippant relatively high in adsorbate content, to that of essentially pure strippant, is retained within the system. The advantage is that the partial enrichment which has been effected in creating the concentration gradient is thus retained, with resultant economy in distillation load. In general, a volume about equal to the liquid capacity of mass D may be recycled in this manner, although a larger volume, for example equal to one and one-half times the liquid capacity of mass D, or a lower volume, for example equal to one-half the liquid capacity of adsorbent mass D may be recycled without distillation, depending on the desired product quality and the character of the feed. In a separation of catalytic reformate having an aromatic content of 48% employing a kerosene stripping agent, a volume equal to the entire liquid capacity of mass D is recycled, and the volume of regeneration zone effluent going to distillation may be reduced as much as 25%.

In the cycle illustrated in Figure 3, adsorbent masses B to D inclusive constitute the adsorbate recovery section of the adsorption zone. At the beginning of the cycle, hot strippant low in adsorbate from the previous cycle, accumulated in insulated storage not shown, is passed via line 7 to mass B, the first terminal mass of the adsorbate recovery section, and the first effluent from the last terminal mass D of the adsorbate recovery section is passed via line 25 into mass E of the adsorbate enriching zone. During the later part of the cycle, hot strippant is fed to mass B, and an adsorbate-strippant stream is withdrawn via line 6 for separation, usually by distillation. During the final part of the cycle strippant continues to flow to mass B, but stream 6 is shut off and a quantity of last effluent as previously described is withdrawn via line 7 and stored for use in the next cycle. At the conclusion of the cycle a new cycle is initiated by regrouping the adsorbent masses and moving the points of introduction and withdrawal of streams in a manner similar to that described in reference to Figure 2.

Figure 4:
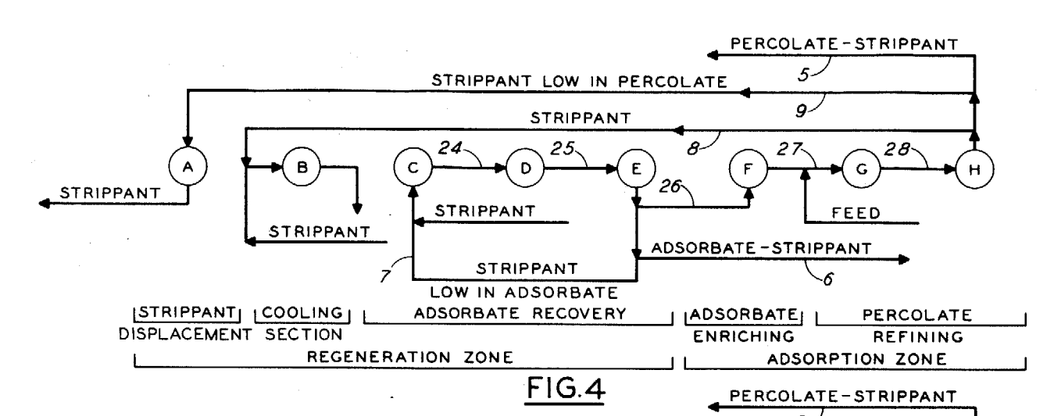

In Figure 4 a further modification of the process is shown in which an intermediate effluent from the adsorption zone, after the essentially pure strippant displaced through line 8 when adsorbent mass H in regenerated condition was connected into the adsorption zone as terminal mass, but before the equilibrium strippant-percolate mixture displaced through line 5 for separation, is recycled through line 9 to regenerated mass A where it displaces essentially pure strippant to storage. The displaced strippant may be used directly in the regeneration zone without distillation, and hence an economy in distillation load results. Operation in the manner indicated permits retention within the system of that portion of the interstitial liquid whose gradient composition ranges from that of essentially pure strippant to that of the desired product stream consisting of strippant relatively high in percolate content. The advantage is that the partial enrichment which has been effected in creating the concentration gradient is thus retained with resultant economy in distillation load. In general, a volume about equal to one-half of the liquid capacity of mass H may be recycled in this manner, although larger or smaller volumes ranging for example from an equal volume to one-fifth of the liquid capacity of mass H may be recycled without distillation, depending on the desired product quality and the character of the feed. In a separation of the catalytic reformate with an aromatic content of 54% and employing refined kerosene as the strippant, a volume equal to about six-tenths of the liquid capacity of mass H is recycled, and the volume of stripping liquid required to be distilled is thereby reduced by about 24%.

In the cycle illustrated in Figure 4, adsorbent masses A to E inclusive constitute the regeneration zone and masses F to H inclusive constitute the adsorption zone. Serially connected masses C, D, and E constitute the adsorbate recovery section, mass F constitutes an adsorbate enriching section, masses G and H a percolate refining section, mass B a cooling section, and mass A a strippant displacement section. Although A and B are shown as two masses in order to separate their respective functions, a single mass equivalent to A or B in adsorbent capacity would in general suffice. In this case, however, storage would be required for stream 9, strippant only partially enriched in percolate, in order to permit such strippant from one cycle to be used last in the next cycle. At the beginning of the cycle illustrated, feed enters the system via line 27 to mass G displacing relatively pure strippant from mass H, which cool strippant flows via line 8 to mass B together with any additional required cooling strippant introduced as shown. The first effluent of the regeneration system, which is substantially richer in the preferentially adsorbed component of the feed than is the feed itself, is passed from terminal mass E via line 26 into first terminal mass F (if there be more than one) of the adsorbate enriching section. Hot strippant low in adsorbate content and accumulated during the preceding cycle flows into first terminal mass C of the adsorbate recovery section. After strippant has been displaced from mass H, strippant low in percolate is passed via line 9 to mass A, or to storage if A and B are replaced by a single mass. After the required displacement of enriching liquid from mass E, an adsorbate rich strippant stream is taken out via line 6 for separation and recovery of the adsorbate. Hot strippant is passed into first terminal mass C of the adsorbate recovery zone after the available strippant low in adsorbate entering via line 7 has been consumed. After strippant low in percolate has been displaced from mass H in required amount, a percolate rich strappant stream is taken out via line 5 for separation and recovery of the percolate. Following displacement of the adsorbate rich strippant stream via line 6, adsorbate lean strippant is taken out via line 7 to storage (not shown) for use in the next cycle. The close of the cycle is determined, for example, by the appearance of feed composition liquid in line 28, the effluent of first terminal mass G of the percolate refining section. Successive cycles are initiated by regrouping the adsorbent masses so that mass A, the first terminal mass of the stripping displacement and cooling section, mass C, the first terminal mass of the adsorbate recovery section, and mass F, the first terminal mass of the adsorbate enriching section if there be more than one mass in the section, become, respectively, the last terminal masses of the percolate refining section, the cooling section and the adsorbate recovery section, and by moving the points of introduction of feed, of hot stripping liquids, of cold stripping liquids, and the points of withdrawal of product and strippant streams to the next serially connected adsorbent mass in the various sections. Operating in the manner illustrated in Figure 4 makes possible the production of an adsorbate and a percolate of improved quality with large reductions in the volumes of percolate-stripping liquid mixture, and of adsorbate-stripping liquid mixture which must be distilled per unit volume of product recovered.

Figure 5:
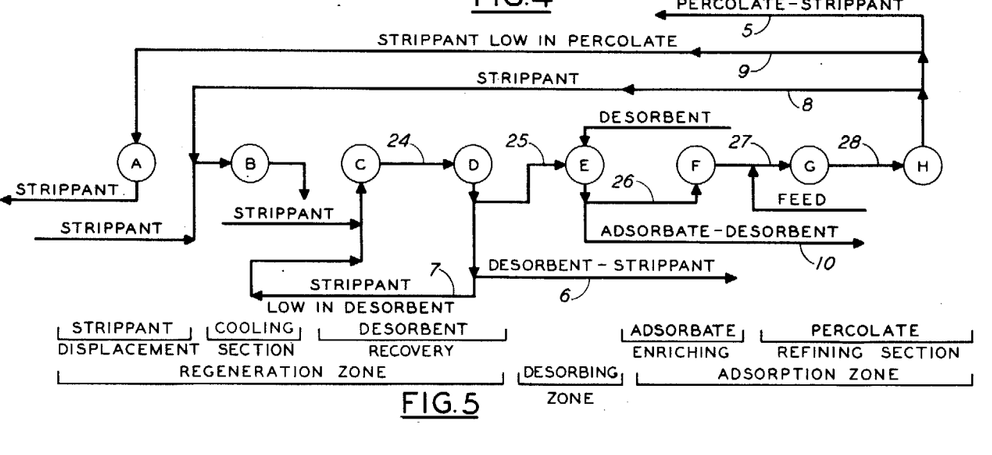

Figure 5 illustrates a modification of the process of the invention in which a desorbent is employed to remove the adsorbate from the adsorbent and the adsorbent is then regenerated by removing the desorbent from it by means of a stripping liquid. The desorbent is a liquid for which the adsorbent shows an adsorptive preference equal to or greater than that which it shows for the preferentially adsorbed fraction of the feed. The percolate may be advantageously employed as the stripping liquid in many separations where a desorbent is utilized. Operation according to the modification illustrated by Figure 5 is as follows:

Hot strippant low is desorbent from line 7, followed by fresh hot strippant, is passed into the desorbent recovery section comprising masses C and D to remove the desorbent from the adsorbent and regenerate the adsorbent. The effluent from the regeneration zone is passed into the desorbing zone comprising mass E via line 25 in the first part of the cycle, to distillation via line 6 for desorbent recovery during an intermediate part of the cycle, and to storage (not shown) via line 7 for first use in the next stripping cycle, during the last part of the current cycle after the strippant stream has become lean in desorbent. The effluent of the desorbing zone is passed into the adsorbate enriching section comprising mass F via line 26 during the first part of the cycle and to distillation for adsorbate recovery via line 10 during the latter part of the cycle. Feed together with effluent from the adsorbate enriching section is passed into the percolate refining section comprising adsorbent masses G and H via line 27. The effluent from this section is passed into the cooling section via line 8 during the first part of the cycle, is used for cooling and strippant displacement via line 9 during an intermediate part of the cycle, and to distillation via line 5 for separation of percolate during the latter part of the cycle. Succeeding cycles of operation are initiated by regrouping the adsorbent masses in the manner previously described. In the next succeeding cycle of operation masses B and C would constitute the strippant displacement and cooling section, masses D and E the desorbent recovery section, mass F the desorbing zone, and masses H and A the percolate refining section. When a liquid other than the percolate is used as the stripping liquid, three distillations are necessary in the process, one to separate liquid-desorbent mixture effluent from the regeneration zone, one to separate adsorbent-desorbent mixture effluent from the desorbing zone, and one to separate percolate-stripping liquid mixture effluent from the percolate refining section. If the percolate is employed as the stripping liquid in the process, and this is the preferred practice and is followed unless the percolate has properties which render its use in this manner undesirable as where it is a liquid of low diffusivity or where it tends to polymerize when heated in contact with the adsorbent, then the step of separating a percolate-stripping liquid mixture disappears and only two distillations are required. In this latter case the total quantity of desorbent introduced into mass E must be sufficient to displace substantially all of the adsorbate held by the adsorbent of mass E.

In connection with the foregoing descriptions of the process flow patterns illustrated by the several figures of the drawing, it should be understood that the total number of adsorbent masses employed and the number employed in each zone and in each section of each zone may be greater or smaller than the number illustrated. The actual number employed is determined by the character of the feed, the desired product quality, and economic considerations in construction. The drawings are functional in character, and in actual practice it is often convenient and/or economic to carry out several successive functions in one mass, while carrying out a different number of functions during the same period in another mass in the system. This has already been illustrated to some extent in Figures 2 to 5 inclusive, for example in the adsorbate recovery sections where several types of streams enter and leave the same adsorbent masses at various times in a single cycle. It is further illustrated by the fact that in Figures 4 and 5, the functions of masses A and B could usually be carried out conveniently in a single mass of adsorbent, mass B for example, the flow being: First, strippant from mass H enters via line 8; second, additional cold strippant from storage may be employed for cooling; third, strippant low in percolate from mass H which has been stored for a portion of the cycle enters also via line 8. Additionally, any or all of these improvements may be applied to a single column mass.

Figure 6:
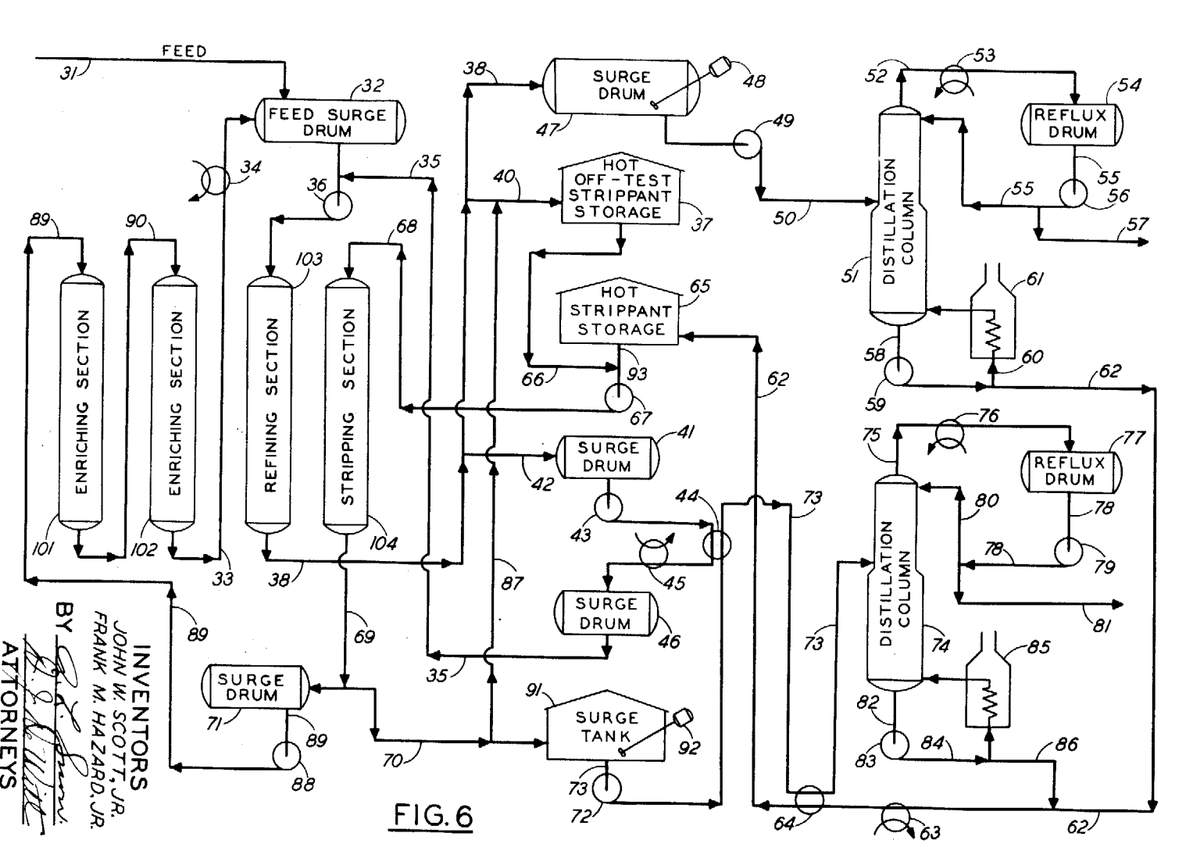
Figure 6 illustrates an arrangement of commercial scale suitable for the practice of the invention.

The manner in which the objectives of this invention are accomplished in practice, and the manner in which the functional description of the invention in Figure 4 is embodied in one particular commercial plant design may be more fully appreciated from the following complete description of the process flow of the plant to be read in conjunction with Figure 6 of the drawings diagrammatically illustrating the flow plan. It will be noted that it is not intended that the invention be limited to this particular plant design, but is capable of other embodiments which extend beyond the scope of the equipment illustrated. Furthermore, certain conventional equipment such as driers, valves, temperature recording and control devices, flow control devices including cycle timers are intentionally omitted for the sake of simplicity, but the inclusion of such conventional equipment is within the skill of the art.

Referring now to Figure 6, the process illustrated is designed to charge 8140 barrels per operating day (BPOD) of a catalytically reformed petroleum naphtha containing about 54 volume percent aromatics and with ASTM initial, 50%, and end points of 140° F., 225° F., and 300° F., respectively, and to produce therefrom 4355 BPOD of aromatics made up of a mixture of benzene, toluene, and xylenes, of 99 volume percent purity, and 3785 BPOD of a raffinate stream containing about 2.2 volume percent aromatics. The adsorbent employed is 28–80 mesh silica gel. A strippant is employed and no desorbent, and the strippant is a kerosene stream boiling above the end point of the feed. In this case the strippant chosen is low in aromatic content.

The four stages 101, 102, 103, 104, each contain 154,000 pounds of adsorbent. In the particular cycle illustrated, 101 and 102 constitute an enriching section, 103 constitutes a refining section, and 104 a stripping section. The quantities of adsorbent provide a gel loading of 0.046 gallon of fresh feed for each pound of gel in the refining stage, this gel loading being specific to the particular composition and molecular weight of feed here employed. The sum of the void volume, that is the interstitial volume between the adsorbent particles and the pore volume is 17,400 gallons in each stage. This volume is hereinafter referred to as a stage displacement. The pumping rates employed are such that a complete cycle is carried out in 30 minutes, following which a new cycle is initiated by regrouping the stages and altering connections preferably by motor valves controlled by an automatic cycle timer, in a manner which will be apparent from previous descriptions in this specification.

Fresh feed flows through line 31 into feed surge drum 32 at the rate of 8140 BPOD, or about 7100 gallons in each one-half hour cycle. The effluent from the last terminal mass 102 of the enriching section, which has approximately feed composition, flows via line 33 and cooler 34 to feed surge drum 32 at the rate of 20,000 BPOD or about 17,500 gallons in each cycle, that is, about one-stage displacement in each cycle. During the first part of the refining cycle about 10,500 gallons in each cycle of a slop raffinate cut, that is, strippant low in percolate, which is in this case the nonaromatic portion of the feed, is pumped to refining section 103 via line 35 and pump 36 at the rate of 40,140 BPOD serving both to cool the refining stage and to displace strippant therefrom. The amount used is thus about 0.7 of a displacement. During the remaining part of the cycle, the mixture of fresh feed and enriching section effluent in feed surge drum 32 is pumped to refining section 103 at the rate of 40,140 BPOD so as to provide 24,600 gallons in each cycle, of which 7100 gallons is fresh feed. The disposition of stock out of refining section 103 is as follows: During the first portion of the cycle, about 10,500 gallons in each cycle of a slop extract stream, that is, strippant containing a small amount of adsorbate, which is in this case the aromatic portion of the feed, is pumped to hot off-test strippant storage 37 via lines 38 and 40 at the rate of 40,140 BPOD. During an intermediate portion of the cycle, about 10,500 gallons in each cycle of a slop raffinate cut, that is, strippant low in nonaromatics, is pumped at the rate of 40,140 BPOD to hot slop raffinate surge drum 41 via lines 38 and 42, whence it flows via pump 43, exchanger 44, and cooler 45 into cold slop raffinate surge drum 46 at a temperature of about 100° F., and is pumped first in the next cycle via line 35 to the new refining section, just as was done in the cycle being described. Thus, the slop raffinate stock remains within the system and the partial enrichment in raffinate characteristic of it is retained within the system. During the last part of the refining cycle, a raffinate still feed rich in raffinate, since the aromatic portion of the feed has been adsorbed on the gel, is pumped at the rate of 40,140 BPOD to the extent of about 14,100 gallons in each cycle, via line 38 to raffinate still feed surge drum 47. Surge drum 47 is provided with stirring mechanism 48 to equalize the raffinate-strippant composition, which varies somewhat during a cycle. Pump 49 transfers the raffinate still feed via line 50 to the conventional fractionating distillation column 51. From column 51 an overhead stream of raffinate free from strippant is passed by line 52 through condenser 53 into reflux drum 54 and a portion of the overhead stream is passed through line 55 and pump 56 to column 51 as reflux. 3785 BPOD of raffinate is passed to storage via line 57. From column 51 a bottoms stream of separated strippant is passed by line 58 and pump 59, with a portion of the bottoms passed through line 60 and heater 61, back to column 51, and the remaining bottoms stream, amounting to 12,355 BPOD of strippant, is pumped via line 62, cooler 63, and exchanger 64 to insulated hot strippant storage tank 65 held at about 300° F.

At the beginning of the stripping cycle, stripping section 104 has just been transferred from adsorbate enriching, that is, extract enriching service where it functioned in the position now occupied by section 101, and is at about 100° F. Stripping section 104, therefore, contains gel which is saturated with aromatics and interstitial liquid approximating feed composition as regards aromatic content. During the first part of the stripping cycle, about 17,500 gallons, or one displacement of hot slop extract, is fed at the rate of 52,000 BPOD from hot off-test strippant storage tank 37 via line 66, pump 67 and line 68 to stripping section 104. Thus, the slop extract stock remains within the system, and the partial enrichment in adsorbate characteristic of it is retained within the system. During the last part of the stripping cycle, 21,000 gallons of hot strippant at about 300° F. is fed at the rate of 52,000 BPOD from hot strippant storage tank 65 via line 93, pump 67, and line 68. During the first part of the stripping operation, 17,500 gallons of recycle, that is, adsorbate enriching liquid which contains about the same over-all aromatic content as fresh feed but contains strippant in addition to raffinate, is fed at the rate of 52,000 BPOD through lines 69 and 70 to surge drum 71. During an intermediate part of the stripping operation, 27,000 gallons of extract still feed is transferred at the rate of 52,000 BPOD via lines 69 and 70 to extract surge tank 91. Surge tank 91 is provided with stirring mechanism 92 to equalize the extract-strippant composition which varies somewhat during a cycle. Pump 72 transfers the extract still feed via line 73 and exchangers 44 and 64 to conventional fractionating still 74. From distillation column 74 an overhead stream of extract containing 99% aromatics and free from strippant is passed by line 75 through condenser 76 into reflux drum 77 and a portion of the overhead stream is passed through line 78, pump 79, and line 80 to column 74 as reflux. 4355 BPOD of extract is passed to storage via line 81. From column 74 a bottoms stream of separated strippant is passed by line 82 and pump 83, with a portion of the bottoms passed through line 84 and heater 85, back to column 74, and the remaining bottoms stream, amounting to 19,645 BPOD of strippant, is pumped via lines 86 and 62, cooler 63, and exchanger 64 to insulated hot strippant storage tank 65 held at about 300° F. It will be noted that the sum of the separated strippant flowing from the extract and raffinate fractionating stills is 32,000 BPOD. During the last part of the stripping operation, 7000 gallons of hot slop extract (strippant low in aromatic content) is fed at the rate of 53,000 BPOD via lines 69, 70, 87, and 40 to the hot off-test strippant tank 37.

During the enriching operation, 17,500 gallons of en-

The stream quantities shown are total daily circulation rates integrated over a 24-hour day in cyclic operation. Further details of the examples are given in Table I.

*Table I*

| Case | Example I | Example II | Example III | Example IV |
|---|---|---|---|---|
| | No Recycle of Strippant Low in Percolate or Adsorbate, Fig. 2 | Recycle of Strippant Low in Adsorbate, Fig. 3 | Recycle of Strippant Low in Percolate Only, not Illustrated | Recycle of Both Strippant Low in Adsorbate and Strippant Low in Percolate, Figs. 4 and 6 |
| Percolate (Raffinate): | | | | |
| Yield | 46.5% of Feed | 46.5% of Feed | 46.5% of Feed | 46.5% of Feed |
| Quality | 2.2% Aromatic. | 2.2% Aromatic. | 2.2% Aromatic. | 2.2% Aromatic. |
| Adsorbate (Extract): | | | | |
| Yield | 53.5% of Feed | 53.5% of Feed | 53.5% of Feed | 53.5% of Feed. |
| Quality | 99% Aromatic. | 99% Aromatic. | 99% Aromatic. | 99% Aromatic. |
| Number of Columns | 4 | 4 | 4 | 4. |
| (Enriching) | (2) | (2) | (2) | (2). |
| (Refining) | (1) | (1) | (1) | (1). |
| (Stripping) | (1) | (1) | (1) | (1). |
| Streams, BPOD: | | | | |
| Fresh Feed | 8140 | 8140 | 8140 | 8140. |
| Recycle to Enriching Section | 20,000 | 20,000 | 20,000 | 20,000. |
| Recycle Strippant Low in Percolate (Cold) | 0 | 12,000 | 0 | 12,000. |
| Recycle Strippant Low in Adsorbate | 0 | 0 | 20,000 | 20,000. |
| Hot Strippant | 44,200 | 44,200 | 32,000 | 32,000. |
| Cold Strippant | 13,300 | 0 | 13,300 | 0. |
| Total Strippant to be Distilled | 57,500 | 44,200 | 45,300 | 32,000. |
| Bbl. Strippant to Distillation per bbl. of Feed | 7.1 | 5.4 | 5.6 | 3.9 | riching liquid of composition described hereinabove is fed throughout the entire cycle at the rate of 20,000 BPOD by means of pump 88 through line 89 to second enriching section 101 whence the entire effluent is fed via line 90 to first enriching section 102. As previously described, the entire cyclic effluent from section 102 consisting of essentially feed composition liquid is displaced into feed drum 32 via line 33 and cooler 34.

It will now be noted that all the functions illustrated in Figure 4 have been included in the operation shown in Figure 6. Use of first adsorbate recovery section effluent as enriching feed to the adsorbate enriching section, and retention of the strippant streams low in percolate (raffinate), and adsorbate (extract) within the circulating system are readily apparent. Less readily apparent, although necessarily present, is recirculation of the first effluent of the percolate refining zone. In the operation described by Figure 6 this first effluent has been combined with strippant low in percolate, corresponding to the combinations of streams 8 and 9 hereinbefore discussed in connection with Figure 4.

In order to show clearly the substantial reduction in the volume of liquid required to be distilled in secondary recovery separations secured by the process of the present invention, several examples are shown in the following Table I. All of the examples refer to the commercial design shown in Figure 6. Example I shows a process according to U. S. Patent No. 2,621,149 and Figure 2 of the present invention in which there is no recycle of the last effluent from the stripping liquid contacting step which last effluent consists essentially of stripping liquid low in adsorbate content, nor a recycle of an intermediate effluent from the feed contacting step after the esentially pure first effluent strippant.

Example II follows Figure 3 in that the effect of recycling the last effluent from the stripping liquid contacting step is illustrated.

Example III shows the effect of recycling an intermediate effluent from the feed contacting step.

Example IV illustrates the results of the present invention, as shown in Figures 4 and 6, in which both of the effluents noted in Examples II and III are recycled.

It is seen from Table I that recycle of strippant low in adsorbate when employing flow pattern of Figure 3 reduced the distillation load by 1.7 barrels per barrel of fresh feed from the base Case I. Expressed in percent the volume of stripping liquid distilled is reduced by 24% when operating according to Figure 3 rather than Figure 2. It is also seen from Table I that recycle of strippant low in percolate results in a reduction in distillation load of 1.5 barrels per barrel of feed for the same degree of separation and the same quality product. When the process is conducted according to the flow pattern of Figure 4, as exemplified in Figure 6, employing both new recycle streams, the reduction in strippant distillation load is 3.2 barrels per barrel of feed, that is a saving of 45% over the base case. These figures illustrate the significant economies in respect to the volume of liquid required to be distilled in secondary recovery separations and consequently in the installation and operating costs of secondary separation which may be obtained by the improved process of this invention.

The improved process of this invention may be applied to any working liquid phase adsorption separation without any limitation as to the feed liquid or adsorbent employed. It may also be applied to any process cycle wherein an extraneous liquid is introduced as strippant or desorbent, whether or not temperature changes are imposed in order to influence and control the adsorption equilibria and regenerate the adsorbent for reuse. However, the preferred feeds are petroleum fractions and the preferred adsorbent is silica gel. Reduction in the volume of liquid required to be distilled in secondary recovery separations is obtained with kerosene distillates, cracked and straight run naphthas, catalytically reformed naphthas, lubricating oils diluted to reduce viscosity, diesel fuel distillates, and Fischer-Tropsch and OXO synthesis products.

The stripping liquid employed is a liquid less strongly adsorbed than the adsorbate fraction of the feed and is preferably an aliphatic hydrocarbon or a mixture of aliphatic hydrocarbons when a silica or silica alumina adsorbent is used in separating petroleum distillates. It may contain appreciable quantities of aromatic compounds. The dominating specification is that the stripping liquid should boil in such a range that it is readily separable from the feed fractions by distillation. The boiling range of the stripping liquid may thus be either higher or lower than that of the feed. During the stripping step, the stripping liquid may be hot, being preferably at 200–300° F. Higher temperatures may be employed where the character of the charge undergoing separation and maintenance of liquid phase present no unusual difficulties.

The desorbing liquid employed is a liquid as strongly or more strongly adsorbed than the adsorbate and is ordinarily an aromatic hydrocarbon or an oxygenated organic compound where a silica or silica alumina adsorbent is employed. The desorbing liquid should be separable from the feed fractions and from the stripping liquid by distillation.

We claim:

1. In an adsorption separation process wherein a solid adsorbent mass is alternately contacted with a liquid feed amenable to separation by selective adsorption to separate an adsorbate and a percolate and with a stripping liquid to remove the adsorbate from the adsorbent and regenerate the adsorbent for reuse, the improved method which comprises recovering the effluent from the adsorbent mass during the stripping liquid contacting step in three fractions: a first effluent fraction consisting substantially of unseparated feed, a second effluent fraction consisting of stripping liquid relatively rich in adsorbate and a third effluent fraction consisting of stripping liquid and relatively lean in adsorbate, and introducing said third fraction into contact with the adsorbent subsequent to the succeeding feed contacting step and prior to the subsequent stripping liquid contacting step, recovering the effluent from the adsorbent mass during the feed contacting steps in three fractions: a first fraction consisting essentially of stripping liquid, a second fraction consisting essentially of stripping liquid and percolate and predominating in stripping liquid and a third effluent fraction comprising stripping liquid and percolate and predominating in percolate, and contacting the adsorbent with said second fraction consisting essentially of stripping liquid and percolate following the next succeeding stripping liquid contacting step and prior to the next succeeding feed contacting step.

2. In a cyclic adsorption separation process wherein a plurality of fixed adsorbent beds are disposed in serially interconnected groups, comprising a group constituting an adsorption zone and a group constituting a regeneration zone, said regeneration zone containing a strippant displacement section and an adsorbate recovery section, wherein a liquid feed amenable to separation by selective adsorption is passed into the adsorption zone to separate an adsorbate and an effluent percolate and wherein a stripping liquid is passed into the regeneration zone to remove previously separated adsorbate from the adsorbent and regenerate the adsorbent for reuse, the improved method which comprises recycling the last effluent from the regeneration zone during each cycle, which last effluent consists predominantly of stripping liquid and which contains some adsorbate, into contact in the next cycle with the adsorbent in the adsorbate recovery section of the regeneration zone, and recycling an intermediate effluent from the adsorption zone during each cycle, which intermediate effluent consists essentially of stripping liquid and contains some percolate, into contact with the strippant displacement section of the regeneration zone.

3. The method as defined in claim 2, wherein the liquid feed is a petroleum distillate.

4. The method as defined in claim 2, wherein the liquid feed is a kerosene distillate.

5. The method as defined in claim 2, wherein the liquid feed is catalytically reformed gasoline.

6. The method as defined in claim 2, wherein the liquid feed is cracked naphtha.

7. In a cyclic adsorption separation process wherein a plurality of solid adsorbent masses are disposed in serially interconnected groups comprising a group constituting an adsorption zone, a group constituting a desorption zone and a group constituting a regeneration zone, said regeneration zone containing a desorbent recovery section and a strippant displacement section, wherein a liquid feed amenable to separation by selective adsorption is passed into the adsorption zone to separate an adsorbate and an effluent percolate, a desorbing liquid is passed into the desorption zone to desorb the adsorbate previously separated and wherein a stripping liquid is passed into the regeneration zone to remove the desorbing liquid from the adsorbent and regenerate the adsorbent for reuse, the improved method which comprises recycling the last portion of the effluent from the regeneration zone during each cycle, which last portion of the effluent consists predominantly of stripping liquid and which contains some desorbent, into contact in the next cycle with the adsorbent in the desorbent recovery section of the regeneration zone prior to contacting it with stripping liquid, and recycling an intermediate effluent from the adsorption zone during each cycle, which intermediate effluent consists essentially of stripping liquid and some percolate, into contact with the strippant displacement section of the regeneration zone.

8. The process as defined in claim 7 wherein the stripping liquid is the percolate fraction of the feed liquid.

9. In an adsorption separation process wherein a solid adsorbent mass is alternately contacted with a liquid feed amenable to separation by selective adsorption to separate an adsorbate and a percolate and with a stripping liquid to remove the adsorbate from the adsorbent and regenerate the adsorbent for reuse, the improved method which comprises separating the total effluent from the adsorbent produced during the stripping liquid contacting step into a first stripping step effluent consisting predominantly of adsorbate and stripping liquid and which contains some percolate, an intermediate stripping step effluent consisting of stripping liquid and less adsorbate than in said first stripping step effluent, and a last stripping step effluent consisting essentially of stripping liquid and lower in adsorbate content than said intermediate stripping step effluent, recycling said first stripping step effluent into contact with the adsorbent following the feed contacting step, recovering said intermediate stripping step effluent, recycling said last stripping step effluent into contact with the adsorbent immediately prior to contacting said adsorbent with pure stripping liquid in the subsequent stripping liquid contacting step, recovering the effluent from the adsorbent mass during the feed contacting step into three feed contacting step fractions, a first feed contacting step effluent fraction consisting essentially of stripping liquid, a second feed contacting step effluent fraction consisting essentially of stripping liquid and percolate and predominating in stripping liquid, and a third feed contacting step effluent fraction comprising stripping liquid and predominating in percolate, and recycling said second feed contacting step effluent fraction into contact with the adsorbent following the stripping liquid contacting step.

10. In an adsorption separation process wherein a solid adsorbent mass is alternately contacted with a liquid feed amenable to separation by selective adsorption to separate an adsorbate and a percolate and with a stripping liquid to remove the adsorbate from the adsorbent and regenerate the adsorbent for reuse, the improved method which comprises recovering the effluent from the adsorbent mass during the feed contacting step into three feed contacting step effluent fractions, a first feed contacting step effluent fraction consisting essentially of stripping liquid, a second feed contacting step effluent fraction consisting essentially of stripping liquid and percolate and predominating in stripping liquid, and a third feed contacting step effluent fraction comprising stripping liquid and percolate and predominating in percolate, recycling successively in order said first and second feed contacting step effluent fractions into contact with the adsorbent during the stripping liquid contacting step, recovering the effluent from the adsorbent mass during the stripping liquid contacting step in three stripping step effluent fractions, a first stripping step effluent fraction consisting of substantially unseparated feed, a second stripping step effluent fraction consisting of stripping liquid relatively rich in adsorbate, and a third stripping step effluent fraction consisting of stripping liquid relatively lean in adsorbate, and recycling said third stripping step effluent fraction into contact with the adsorbent prior to contacting said adsorbent with the first and second feed contacting step effluent fractions from the feed contacting step.

11. In an adsorption separation process wherein a solid adsorbent mass is alternately contacted with a liquid feed amenable to separation by selective adsorption to separate an adsorbate and a percolate and with a stripping liquid to remove the adsorbate from the adsorbent and regenerate the adsorbent for reuse, the improved method which comprises separating the total effluent from the adsorbent produced during the stripping liquid contacting step into a first stripping step effluent consisting predominantly of adsorbate and stripping liquid and which contains some percolate, an intermediate stripping step effluent consisting of stripping liquid and less adsorbate than in said first stripping step effluent, and a last stripping step effluent consisting essentially of stripping liquid and lower in adsorbate content than said intermediate stripping step effluent, recycling said first stripping step effluent into contact with the adsorbent following the feed contacting step, recycling said last stripping step effluent into contact with the adsorbent immediately prior to contacting said adsorbent with pure stripping liquid in the subsequent stripping liquid contacting step, recovering the effluent from the adsorbent mass during the feed contacting step into three feed contacting step effluent fractions, a first feed contacting step effluent fraction consisting essentially of stripping liquid, a second feed contacting step effluent fraction consisting essentially of stripping liquid and percolate and predominating in stripping liquid, and a third feed contacting step effluent fraction comprising stripping liquid and percolate and predominating in percolate, recycling said first feed contacting step effluent fraction into contact with the adsorbent during the stripping liquid contacting step and following the recycling to the adsorbent mass of the first and last stripping step effluents, and recycling said second feed contacting step effluent fraction into contact with the said adsorbent immediately following the recycling of the first feed contacting step effluent fraction from the feed contacting step.

12. In an adsorption separation process wherein a liquid feed amenable to separation by selective adsorption is separated by contact with a solid adsorbent into an adsorbate and a percolate and the solid adsorbent is thereafter contacted with a stripping liquid to remove the adsorbate from the adsorbent and regenerate the adsorbent for reuse, the improved cyclic method which comprises maintaining a first group of serially interconnected solid adsorbent masses constituting a regeneration zone, said regeneration zone containing a strippant displacement section, a cooling section, and an absorbate recovery section, the last terminal mass of the said strippant displacement section being connected to the first terminal mass of the cooling section, and the last terminal mass of the cooling section being connected to the first terminal mass of the adsorbate recovery section, maintaining a second group of serially interconnected solid adsorbent masses constituting an adsorption zone, said adsorption zone containing an adsorbate enriching section and a percolate refining section, the last terminal adsorbent mass of the adsorbate enriching section being connected to the first terminal mass of the percolate refining section, passing the liquid feed into the first terminal adsorbent mass of the percolate refining section of the adsorption zone, passing a substantial portion of the first effluent from the adsorption zone during each cycle into the first terminal mass of the cooling section of the regeneration zone, passing a substantial portion of an intermediate effluent from the adsorption zone during each cycle into the first terminal mass of the strippant displacement section of the regeneration zone, recovering the remainder of the effluent from the adsorption zone during each cycle, passing a stripping liquid into the first terminal adsorbent mass of the adsorbate recovery section of the regeneration zone to remove from the adsorbent the adsorbate separated in previous cycles of operation, recovering an intermediate effluent from the last terminal adsorbent mass of the adsorbate recovery section of the regeneration zone during each cycle, passing the last effluent from the last terminal adsorbent mass of the adsorbate recovery section of the regeneration zone during each cycle into the first terminal mass of the adsorbate recovery section of the regeneration zone in the next cycle, and initiating successive cycles of operation by regrouping the adsorbent masses and moving the points of liquid introduction and withdrawal in such a manner that the first terminal adsorbent masses of the strippant displacement section, the cooling section, and the adsorbate recovery section of the regeneration zone, the adsorbate enrichment section and the percolate refining section of the adsorption zone in one cycle become the last terminal adsorbent masses of the percolate refining section of the adsorption zone, the strippant displacement section of the regeneration zone, the cooling section of the regeneration zone, the adsorbate recovery section of the regeneration zone, and the adsorbate enrichment section of the adsorption zone respectively in the succeeding cycle of operation.

13. In an adsorption separation process wherein a liquid feed amenable to separation by selective adsorption is separated by contact with a solid adsorbent into an adsorbate and a percolate and the solid adsorbent is thereafter contacted with a stripping liquid to remove the adsorbate from the adsorbent and regenerate the adsorbent for reuse, the improved cyclic method which comprises maintaining a first group of serially interconnected solid adsorbent masses constituting a regeneration zone, said regeneration zone containing a strippant displacement section, a cooling section, and an absorbate recovery section, the last terminal mass of the said strippant displacement section being connected to the first terminal mass of the cooling section, and the last terminal mass of the cooling section being connected to the first terminal mass of the adsorbate recovery section, maintaining a second group of serially interconnected solid adsorbent masses constituting an adsorption zone, said adsorption zone containing an adsorbate enriching section and a percolate refining section, the last terminal adsorbent mass of the adsorbate enriching section being connected to the first terminal mass of the percolate refining section, passing the liquid feed into the first terminal adsorbent mass of the percolate refining section of the adsorption zone, passing a substantial portion of an intermediate effluent from the adsorption zone during each cycle into the first terminal mass of the strippant displacement section of the regeneration zone, recovering the remainder of the effluent from the adsorption zone during each cycle, passing a stripping liquid into the first terminal adsorbent mass of the adsorbate recovery section of the regeneration zone to remove from the adsorbent the adsorbate separated in previous cycles of operation, passing the first effluent from the last terminal adsorbent mass of the adsorbate recovery section of the regeneration zone during each cycle into the first terminal adsorbent mass of the adsorbate enrichment section of the adsorption zone, recovering an intermediate effluent from the last terminal adsorbent mass of the adsorbate recovery section of the regeneration zone during each cycle, passing the last effluent from the last terminal adsorbent mass of the adsorbate recovery section of the regeneration zone during each cycle into the first terminal mass of the adsorbate recovery section of the regeneration zone in the next cycle, and initiating successive cycles of operation by regrouping the adsorbent masses and moving the points of liquid introduction and withdrawal in such a manner that the first terminal adsorbent masses of the strippant displacement section, the cooling section, and the adsorbate recovery section of the regeneration zone, the adsorbate enrichment section and the percolate refining section of the adsorption zone in one cycle become the last terminal adsorbent masses of the percolate refining section of the adsorption zone, the strippant displacement section of the regeneration zone, the cooling section of the regeneration zone, the adsorbate recovery section of the regeneration zone, and the adsorbate enrichment section of the adsorption zone respectively in the succeeding cycle of operation.

References Cited in the file of this patent

UNITED STATES PATENTS 2,621,149   Scott et al. ______________ Dec. 9, 1952

UNITED STATES PATENT OFFICE
CERTIFICATE OF CORRECTION

Patent No. 2,797,190                                              June 25, 1957

John W. Scott, Jr., et al.

It is hereby certified that error appears in the printed specification of the above numbered patent requiring correction and that the said Letters Patent should read as corrected below.

Column 2, line 62, for "suitably" read —substantially—; column 7, line 30, for "strappant" read —strippant—; line 69, for "low is" read —low in—; column 12, line 35, for "emplowing" read —employing—.

Signed and sealed this 6th day of August 1957.

(SEAL)
Attest:

KARL H. AXLINE
Attesting Officer

ROBERT C. WATSON
                                                                                     Commissioner of Patents